United States Patent
Bolz et al.

(10) Patent No.: US 7,245,474 B2
(45) Date of Patent: Jul. 17, 2007

(54) CIRCUIT ARRANGEMENT AND METHOD FOR CONTROLLING A BISTABLE MAGNETIC VALVE

(75) Inventors: Stephan Bolz, Pfatter (DE); Günter Lugert, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 174 days.

(21) Appl. No.: 10/818,283

(22) Filed: Apr. 5, 2004

(65) Prior Publication Data

US 2004/0223282 A1    Nov. 11, 2004

(30) Foreign Application Priority Data

Apr. 3, 2003    (DE) ................ 103 15 282

(51) Int. Cl.
*H01H 47/32* (2006.01)
(52) U.S. Cl. .............. 361/154; 361/160; 361/194
(58) Field of Classification Search ............. 361/152, 361/139, 154, 160, 194, 195, 206
See application file for complete search history.

(56) References Cited

U.S. PATENT DOCUMENTS

| | | | | |
|---|---|---|---|---|
| 3,204,224 A | * | 8/1965 | Grewe et al. ............... 377/97 |
| 4,180,026 A | * | 12/1979 | Schulzke et al. .......... 123/490 |
| 4,226,261 A | * | 10/1980 | Ekeleme et al. .......... 137/469 |
| 4,922,878 A | * | 5/1990 | Shinogle et al. .......... 123/490 |
| 5,673,165 A | * | 9/1997 | Kuhn et al. ............... 361/154 |
| 6,450,478 B2 | * | 9/2002 | Parsons et al. ......... 251/129.04 |

FOREIGN PATENT DOCUMENTS

| | | |
|---|---|---|
| DE | 37 33 091 A1 | 4/1989 |
| DE | 38 10 154 A1 | 10/1989 |
| DE | 43 41 797 A1 | 6/1995 |
| DE | 197 42 283 A1 | 4/1999 |
| DE | 100 51 310 A1 | 1/2002 |
| DE | 197 55 957 C2 | 10/2002 |

* cited by examiner

*Primary Examiner*—Brian Sircus
*Assistant Examiner*—Terrence Willoughby
(74) *Attorney, Agent, or Firm*—Baker Botts L.L.P.

(57) ABSTRACT

A circuit arrangement and also a method for controlling a bistable magnetic valve in which a magnetic valve is to be supplied with a pulse of electrical current in order to switch over the magnetic valve from a first stable state into a second stable state, comprises a power supply source to provide a supply voltage, a power supply device fed by the power supply source and able to be activated for the duration of the current pulse by an entered control signal (Enable) to create a coil current (I) flowing through the magnetic coil, with the coil current (I) being set to a setpoint, where changeover means are provided in order to reduce the setpoint of the coil current during the current pulse. This advantageously allows the power dissipation of the activation of bistable magnetic valves to be reduced.

15 Claims, 3 Drawing Sheets

Prior Art

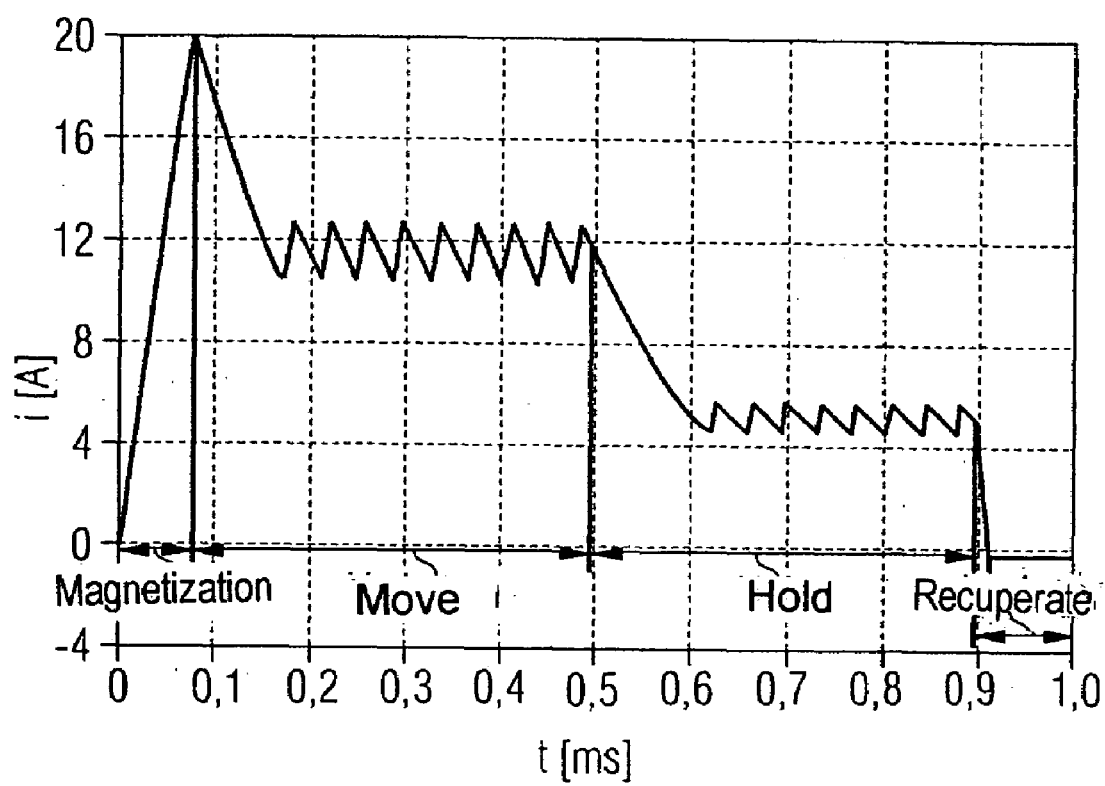

CIRCUIT ARRANGEMENT AND METHOD FOR CONTROLLING A BISTABLE MAGNETIC VALVE

PRIORITY

This application claims priority to German application no. 103 15 282.2 filed Apr. 3, 2003.

TECHNICAL FIELD OF THE INVENTION

The present invention relates to a circuit arrangement and also a method for controlling a bistable magnetic valve in which a magnetic valve is to be supplied with a pulse of electrical current in order to switch over the magnetic valve from a first stable valve state into a second stable valve state. The outstanding feature of such bistable magnetic valves is that in the stable state they do not require any control current but merely require a control current (current pulse) on switchover.

BACKGROUND OF THE INVENTION

Bistable magnetic valves are for example used in rapid-switching hydraulic actors and hydraulically-assisted servo valves in motor vehicles. A magnetic valve used for the opening and closing a hydraulic passage can in this case be held in a relevant end position by magnetic remanence forces of a flow line part (yoke). To keep the forces needed to hold the valve down, such valves are usually pressure compensated so that the hydraulic pressure does not exercise any force in the sense of activation of the valve in this case ("pressure-compensated valve").

FIG. 1 shows schematically the basic structure of a known bistable magnetic valve (Internet site at www.sturmanindustries.com, November 2002). The magnetic valve 1 has a housing 3, through which hydraulic channels 5, 7 and 9 run into the inside of the housing 3. In the inside of the housing 3 a magnetic armature 11, also called in this type of valve a valve needle or "spool" is guided so that it can move.

In FIG. 1 the magnet armature 11 is shown in its left-hand end position. In this position all hydraulic channels 5, 7 and 9 have a fluid interconnection (valve open) to each other through suitably arranged channels inside the magnetic armature 11 (not shown), whereas in a right-hand end position of the magnetic armature 11 these hydraulic channels 5, 7 and 9 are separated from each other (valve closed).

To switch the magnetic armature 11 between its two stable positions the magnetic valve 1 has two magnetic windings or magnetic coils 13 and 15 which are supplied with an electrical current pulse in order on the one hand to pull the magnetic armature 11 to the left to open the valve (magnetic coil 13) and on the other hand to close the valve 1 by pulling it to the right (magnetic coil 15). The magnetic flux induced by the magnetic coils 13 and 15 is guided and amplified in a known way through the flux guidance parts 17 and which, like the magnetic armature 11, are made of soft magnetic material.

Typical applications for these types of bistable magnetic valves are electro-hydraulic devices in motor vehicles, for example hydraulically-assisted diesel injection valves and hydraulically-activated valve drives (inlet/outlet valves) for internal combustion engines.

A circuit arrangement based on internal developments by the applicant for controlling a bistable magnetic valve, such as the magnetic valve 1 shown in FIG. 1, is shown in FIG. 2, whereby, to simplify the diagram, only the part of the circuit for supplying current to a magnetic coil 13 of a bistable magnetic valve in FIG. 2 is shown. In practice an identical circuit part is used to control the second magnetic coil.

FIG. 2 shows a power supply source for providing a supply voltage Uv, which in the exemplary embodiment shown is 48V and for example represents the output voltage of a DC/DC voltage converter of an on-board power supply in a motor vehicle.

The magnetic coil 13 is represented in FIG. 2 by its equivalent circuit (Inductor Lcoil and ohmic resistor Rcoil). Typical values are Lcoil=150 µH and Rcoil=1Ω. The current pulse used to switch over the magnetic valve (coil current) has a typical duration of 1 ms and a peak value of around 20 A. To achieve this peak value of the coil current a voltage of around 20V would be sufficient for the given value of Rcoil. However in order to build up the coil current rapidly at the beginning of the current pulse, a significantly higher voltage, namely the supply voltage Uv of 48V is fed to magnetic coil 13. When the supply voltage Uv is applied to magnetic coil 13 at the beginning of the switchover process, current I through the winding increases in accordance with the equation $di/dt=Uv/Lcoil$, from which it can be seen that the increase of the coil current I becomes steeper, the greater the voltage Uv delivered to the winding.

In practice the power dissipation produced in the coil resistor Rcoil limits the switching frequency of the magnetic valve. With high pressure diesel systems ("Common Rail") with multiple injections for example, this limits the number of injection processes possible at high engine speeds. In a similar way the power dissipation produced in a valve controller using these types of magnetic valve also represents a technical challenge which often forces additional, expensive heat dissipation methods to be used. In order it to limit the power dissipation in the example shown, the coil current is adjusted for the duration of the current pulse, as described in detail below.

The circuit is activated by the "Enable" signal which can be produced for example by a microcontroller. If this enabling signal or activation signal Enable has a logical high level a transistor (FET) T2 is switched on to the gate of which the enable signal is applied. In addition, at least at the beginning of the current pulse, a transistor (FET) T1 is also switched on by also applying the high level to the gate of transistor T1 and by doing this indirectly via an AND element 30, which at an input connection IN1 receives the enable signal and which is connected at its output with the gate of T1. The transistors T1 and T2 form a current switching device which in a first switching state (T1 and T2 switched on) feed the supply voltage Uv to the magnetic coil 13. In this state the coil current flows from the supply voltage source via T1, Lcoil, Rcoil, T2 and finally via coil current measuring resistor Rsense back to the supply voltage source. In second circuit state T1 is however switched off by applying a low level to a second input connection IN2 of the AND element 30, so that an free-running circuit is provided for the coil current. The level at the second input connection IN2 is activated, as described in more detail below, depending on coil current. In this state the coil current flows from a pole (0) of the supply voltage source via a diode D2, the magnetic coil 13, the transistor T2 and finally the measuring resistor Rsense back to pole 0 of the power supply source.

The current switching device T1, T2 serves as a control element within the framework of the adjusting the coil current I for the duration of the current pulse to a desired target current (setpoint) of 20 A here. For this purpose an actual value of the coil current is measured as a voltage drop at measurement resistor Rsense, amplified by means of a differential amplifier Diff_Amp and the amplified voltage compared by means of a comparator Komp with a reference voltage Vref for which the output signal is presented to the second input IN2 of the AND element 30.

These components, which can be seen at the bottom of FIG. 2 thus form a setpoint specification unit for specifying a setpoint of the coil current, a measuring unit for measuring an actual value of the coil current as well as a regulator for forming the system deviation signal from the setpoint and the actual value of the coil current and for controlling the power switching device.

Comparator Komp has a hysteresis, so that if its output exceeds an upper limit Vref+Vhyst at low-level, it switches to low level and only switches back to high when it falls back below a lower limit Vref−Vhyst.

At the beginning of the current pulse the voltage drop at Rsense is small. The current now rises over time and the voltage drop amplified by the differential amplifier Diff_Amp exceeds the upper limit Vref+Vhyst. The output of comparator Komp switches to low, whereon the output of the AND element 30 also switches to low. This switches off the transistor T1. The corresponding timing graph of the coil current I can be seen from FIG. 3 (rising edge).

Driven by the counter EMF (Electromotive Force) of the inductor Lcoil the potential at the source of the transistor T1 will fall until (e.g. at around −0.7V) the free-running diode D1 becomes conductive and accepts the coil current. The coil current continues to circulate in the free-running circuit (D2, Lcoil, Rcoil, T2, Rsense) in which case its value falls slowly. If it has fallen far enough for the voltage drop amplified by the differential amplifier to exceed the lower limit Vref−Vhyst at the measuring resistor, the output of the comparator switches back to high, whereon, switched via the AND element 30, the transistor T1 switches back on. As a result the coil current will rise again until the switch-off point described above is reached once more. The current thus oscillates to and fro periodically between the lower and the upper limit, as can be seen from the center area of FIG. 3.

At the end of the current pulse the Enable signal now switches to low so that the transistors T1 and T2 are switched off at the same time. Driven by the counter EMF of the inductor Lcoil, the voltage at the magnetic coil 13 switches over and there is a current flow through the diodes D1 and D2 from the magnetic coil 13 into the power supply source. The inductor thus discharges (recirculates) into the power supply. In this phase the EMF collapses and the voltage at the magnetic coil 13 as well as the coil current drop rapidly to zero. This can be seen in the right-hand part of FIG. 3 (falling edge).

The power dissipation of this circuit arrangement is essentially determined by the switching times of transistor T1, in that the drain-source voltage for each switchover process passes through the potential area between 0 and 48V at full coil current. The instantaneous peak power dissipation at transistor T1 can in this case be around 1 kW for example. A reduction of the switching times for the purposes of reducing the power dissipation at T1 comes up against the problem however of the associated increase in EMC (electromagnetic compatibility), since as switching times become shorter the frequency spectrum created will increasingly contain higher frequency components. It is thus true to say that a compromise between power dissipation (heating up) and EMC disturbance created is to be found, in which case the room for maneuver is as a rule very small.

SUMMARY OF THE INVENTION

Accordingly one of the objects of the present invention is to remedy the disadvantages described above and especially to create a circuit arrangement as well as a method for controlling a bistable magnetic valve which make low power dissipation possible or, for a specific power dissipation, allow greater switching times.

This object can be achieved by a circuit arrangement to control a bistable magnetic valve in which a magnetic coil is to be supplied with an electrical current pulse to switch the magnetic valve from a first stable valve state into a second stable valve state, comprising a power supply source to provide a supply voltage, a power supply device fed by the power supply source and able to be activated for the duration of the current pulse by an entered control signal to create a coil current flowing through the magnetic coil, wherein the coil current being set to a setpoint, and changeover means to reduce the setpoint of the coil current during the current pulse.

The circuit arrangement may further comprise a current regulation unit for regulating the coil current to the setpoint, comprising a current switching device, which in a first switching state feeds the supply voltage to the magnetic coil and in a second switching state provides a free-running circuit for the coil current, a setpoint reference device to specify the setpoint of the coil current, a measuring device to measure an actual value of the coil current, and a regulator for forming a system deviation signal from setpoint and actual value of the coil current and for corresponding activation of the current switching device, wherein the current regulation device features the changeover means to reduce the setpoint of the coil current when this setpoint is reached for the first time after the beginning of the current pulse. The circuit arrangement can be embodied in such a way as to prespecify the setpoint of the coil current so that when this setpoint is reached an essentially complete magnetization of soft-magnetic material is achieved which is arranged to amplify the magnetic flux induced by the magnetic coil in the magnetic valve. The changeover means can be embodied to abruptly reduce the setpoint of the coil current to a lower setpoint when this setpoint is reached for the first time. The changeover means can be embodied to further reduce the reduced setpoint after a presepecified period of time has elapsed, especially to abruptly reduce it even further. The circuit can be embodied to prespecify the period of time, depending on at least one variable signal.

The object can also be achieved by a method to control a bistable magnetic valve in which a magnetic coil is to be supplied with an electrical current pulse to switch the magnetic valve from a first stable valve state into a second stable valve state, comprising the steps:

providing of a supply voltage,
  providing power supply from the supply voltage for the duration of the current pulse to create a coil current flowing through the magnetic coil with the coil current being set to a setpoint, and
  reducing of the setpoint of the coil current during the current pulse.

The method may further comprise the steps of
  regulating the coil current to the setpoint, wherein the current regulation comprises the steps:
   a) feeding the supply voltage to the magnetic coil in a first switching state and forming a free-running circuit for the coil current in a second switching state,
   b) prespecifying the setpoint of the coil current,
   c) measuring an actual value of the coil current, and d) forming the system deviation signal from setpoint and actual value of the coil current and corresponding switchover between the first switching state and the second switching state, reducing the setpoint of the coil current when this setpoint is first reached after the beginning of the current pulse.

The setpoint of the coil current can be specified so that, when this setpoint is reached, an essentially complete magnetization of soft-magnetic material is achieved, which is arranged to strengthen the magnetic flux induced by the magnetic coil in the magnetic valve. The setpoint of the coil current can be reduced abruptly to a lower setpoint the first time that this setpoint is reached. The reduced setpoint can be reduced even further after a prespecified period of time has elapsed, especially reduced abruptly even further. The period of time can be prespecified depending on at least one variable signal.

With the circuit arrangement in accordance with the invention the coil current is controlled by changes over time, namely a reduction of a setpoint of the coil current during the current pulse. The concrete timing curve of the coil current can in this case be optimally adapted to the operational requirements of the magnetic valve to be controlled. However the reduction of the coil current leads in practice to a significant reduction of the losses in the activation circuit as well as in the coil resistance of the magnetic coil. Through the current requirement of the magnetic coil averaged over the duration of a current pulse and thereby lower current requirement throughout operation, the requirements for the performance of the power supply source used are lower. This is for example of great importance if the power supply source is implemented as a switched-mode regulator which can be constructed very much more simply and cheaply. The power dissipation both in the control circuit and also in such a switched-mode regulator for supplying operating power is thus significantly reduced so that then for example a control unit including both functions can be implemented for motor vehicles which means a simpler and cheaper implementation of these two functions. In particular the usual requirement for heat dissipation from this unit can be implemented comparatively easily. The low power dissipation even makes it possible to combine the functions of valve control and of switching power supply (switched-mode regulator) on a single circuit board.

A further surprising effect is achieved with the invention in that the "discharge phase" (recuperation) of the coil inductance of the magnetic coil is shortened. This effect is based on the fact that the coil current at the end of the current pulse possesses the reduced setpoint (or the even further reduced setpoint, respectively) and thereby begins the recuperation at a comparatively low coil current and thus ends it earlier. This advantageously reduces the minimum period of time between an opening and closing of the magnetic valve used (or vice versa). This is for example of major significance when the magnetic valve is a fuel injection valve of an internal combustion engine because it allows the minimum possible injection amount to be reduced. This in its turn is advantageous as part of an optimization of the fuel consumption and/or exhaust emissions of internal combustion engines.

The invention can also be used, with a specific permitted power dissipation, to provide relatively long switching times for a clocked coil power supply, as for example can be easily implemented with a circuit arrangement in accordance with the invention. The slowing down of such switching times is linked to a significant reduction of the EMC problems generated by switching processes.

The embodiments in accordance with the invention optimize the optimization to the extent that advantageously an essentially complete magnetization of soft magnetic flux amplification material is achieved, although the coil current averaged over the duration of the current pulse is comparatively low. It is known that it is sufficient for magnetic saturation of such materials and thus to guarantee the maximum remanence for this magnetization to only be induced briefly through the magnetic field of the coil. The reduction of the coil current provided by this embodiment after the essentially complete magnetization is achieved preferably occurs at a reduced setpoint for which the strength of the magnetic field thus induced lies below the saturation limit of the soft magnetic material used, especially less than 60% of the saturation magnetic field. In the simplest case the value of the reduced setpoint is one which is at least constant for a specified period of time.

The advantage of such a magnetization at the beginning of the current pulse is maintained even if the coil current is abruptly set to a lower current immediately after this setpoint is first reached, which is advantageous as regards the minimization of the average current requirement.

The embodiments in accordance with the invention allow a further optimization of the coil current curve in respect of typical operational characteristics of bistable magnetic valves. In this embodiment there is provision for the already reduced setpoint of the coil current to be reduced even further after a specific period has elapsed. The predetermination of the period of time can take account here of the fact that the magnetic armature of a magnetic valve requires a certain time on switchover to reach the new end position in the magnetic valve. The prespecified period of time preferably corresponds to this time it needed by the magnetic armature to move.

If a regulation of the coil current with a corresponding coil current measurement to determine an actual value of the coil current is provided, this current measurement which is provided in any event is preferably employed to derive a trigger signal which displays the first time that the setpoint is reached and initiates the reduction of the setpoint.

The fact that the setpoint of the coil current is only reached for the first time during the current pulse is stored in a preferred embodiment by a digital storage element (e.g. flip-flop), for example by feeding the above-mentioned trigger signal to an input of this digital storage element, in which case to reset the digital storage element the characteristic edge of the control signal (enable signal) can advantageously be employed.

If current regulation is used for the coil current the setpoint of the coil current can be reduced in a simple way by modifying the gain of a regulator and/or the reference (with which a coil current measurement signal is compared) accordingly, typically switched over by an output signal of the above-mentioned digital storage element. A similar situation applies for the further reduction of the coil current setpoint which may be provided, which can preferably be triggered by a digital timer (e.g. monoflop).

The further reduced setpoint is preferably designed so that the hold forces induced for it hold the magnetic armature of the magnetic valve used securely in its end position in order to prevent any release (bounce) of the armature on a stop surface which is usually provided.

If the already reduced setpoint is reduced further after a prespecified period of time, this period of time can simply begin either with the activation of the control signal or the first time that the original setpoint is reached. Alternatively or additionally at least one measured value signal can be taken into consideration in the prespecification of this period of time. Such a measured value signal can for example be provided as an output signal of a microcontroller and take account of further variables which relate to the time required to move the magnetic armature, such as the temperature (and thus the viscosity) of a hydraulic oil for which the magnetic valve opens and closes a passage.

If an abrupt reduction of the setpoint and/or an abrupt even further reduction of the setpoint is provided, transistors of one type are used in a preferred embodiment which are identical to the types of transistors which are employed for the controlled (switched) coil power supply, for example CMOS transistors. These transistors can be employed, as previously mentioned, for switching over the gain of the differential amplifier and/or for switching between different references for the comparator.

BRIEF DESCRIPTION OF THE DRAWINGS

The invention is explained in more detail below merely using typical examples relating to the enclosed drawings. These show:

FIG. 5 is a diagram of the timing curve of the coil current as produced by the circuit arrangement shown in FIG. 4.

DETAILED DESCRIPTION OF THE PREFERRED EMBODIMENTS

Figure 1:
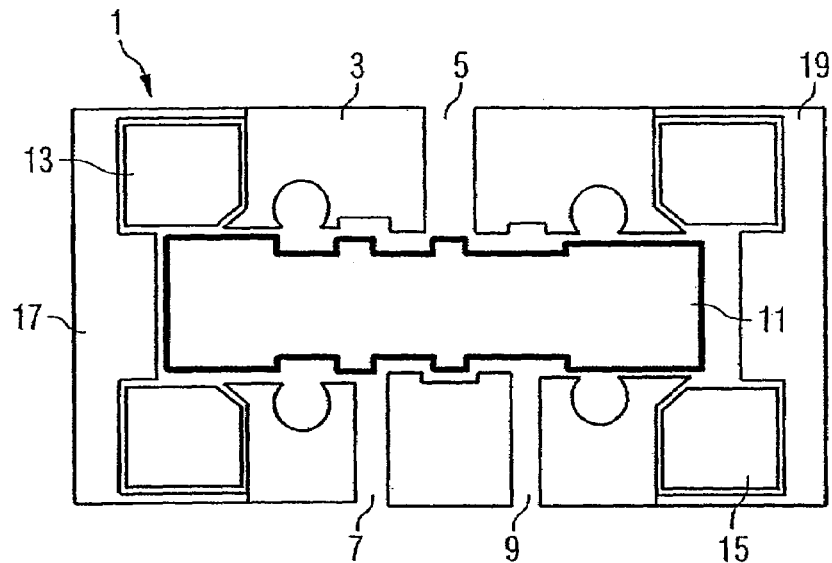
FIG. 1 is a schematic diagram of a bistable magnetic valve in accordance with the prior art.
Figure 2:
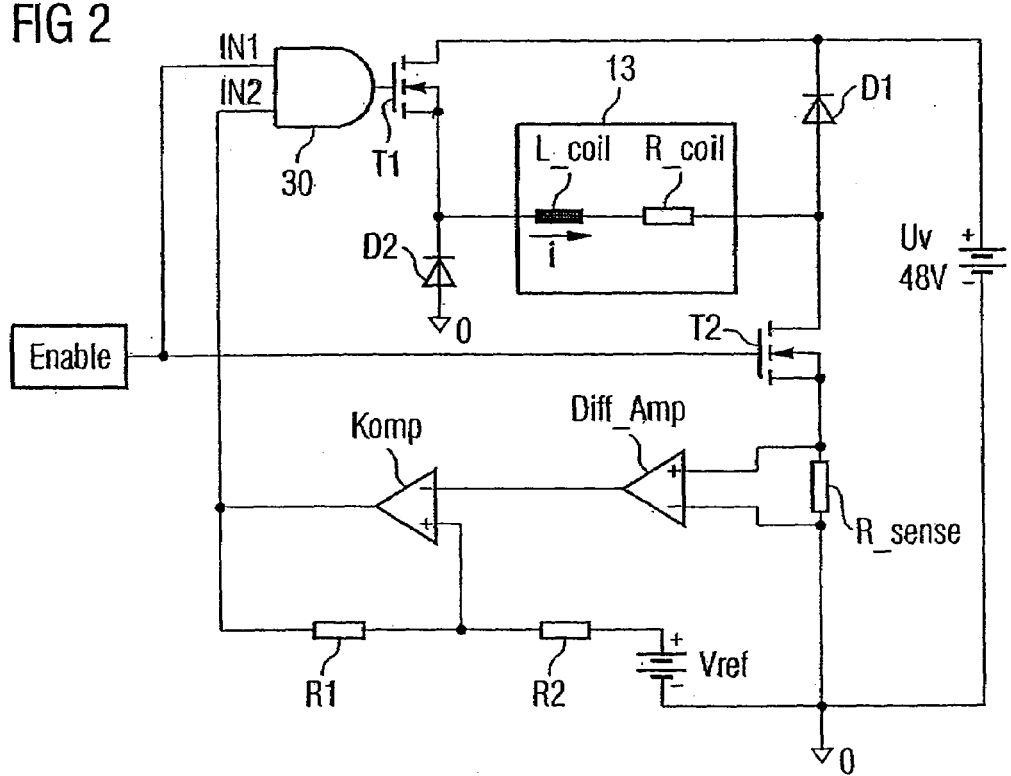
FIG. 2 is a circuit arrangement for controlling a bistable magnetic valve.
Figure 3:
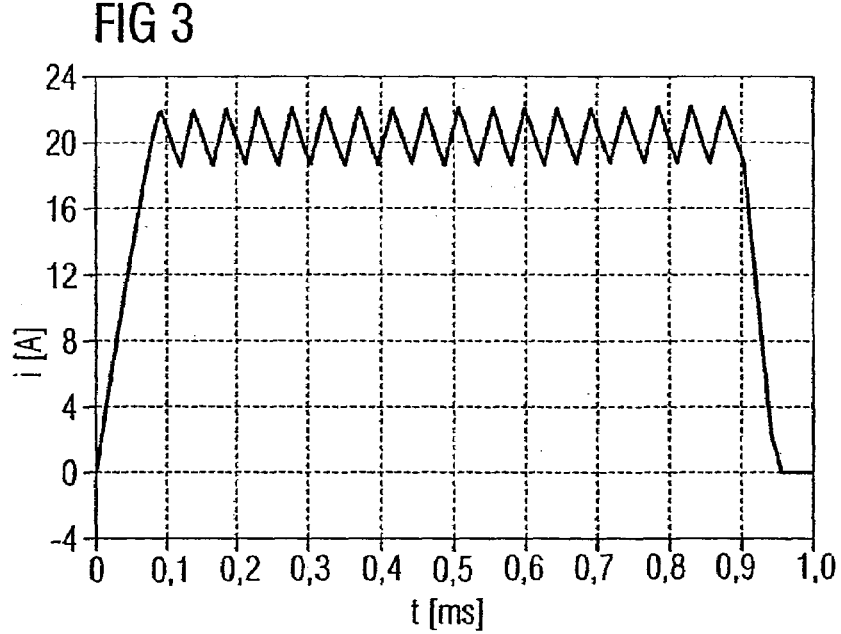
FIG. 3 is a diagram of the timing curve of the coil current as produced by the circuit arrangement in accordance with FIG. 2.

FIGS. 1, 2 and 3 show a conventional magnetic valve, a control circuit for this and also the timing curve of the coil current generated with this circuit for the duration of a current pulse to switch over the magnetic valve. These Figures have already been described in detail above and represent the point of departure for the exemplary embodiment of a circuit arrangement in accordance with the invention described below. In this subsequent description only the differences to the circuit arrangement already described (FIG. 2) or the current curve produced by it (FIG. 3) are described and otherwise the reader is explicitly referred to this previous description.

The circuit shown in FIG. 4 essentially functions like the circuit already described with reference to FIG. 2. In particular there is again a regulation of the coil current by a differential amplifier Diff_Amp and a comparator Komp, in which case the duration of the desired current pulse is again defined by a high level of an enable signal (activation signal) Enable.

Figure 4:
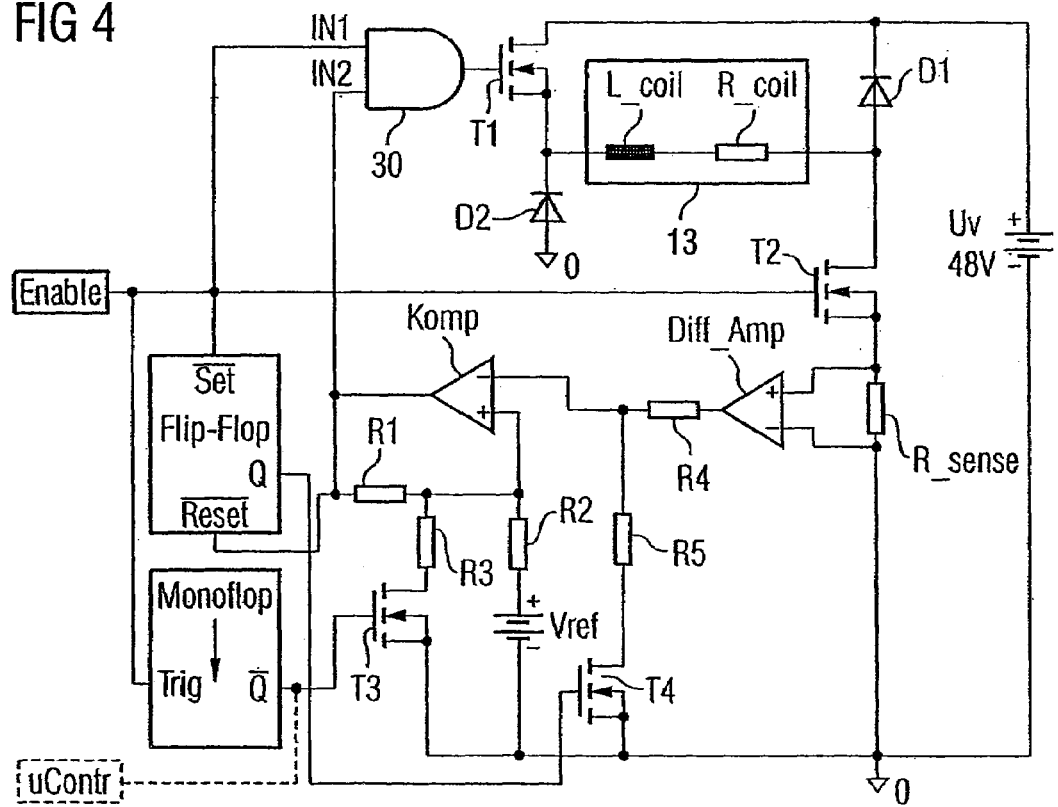
FIG. 4 is a circuit arrangement in accordance with invention for controlling a bistable magnetic valve.

In the circuit in accordance with FIG. 4 however the amplification factor of the differential amplifier Diff_Amp is increased by a factor of 2 and a voltage divider is provided at the output of the differential amplifier which is made up of resistors R4 and R5 and in the example here just equalizes the increased amplification factor if a transistor T4 is switched on, which is the case at the beginning of the current pulse, so that at the beginning of the current pulse there is initially a rise in the coil current to the same setpoint of for example 20 A.

A further difference with the circuit shown in FIG. 4 is that by switching on a transistor T3 a voltage divider consisting of the resistor R2 and an additional resistor R3 is formed which leads to a reduction of that voltage with which the measurement voltage amplified by the differential amplifier is compared.

The gates of transistors T3 and T4 are activated via output signals of a monoflop or flip-flop. The gate of T4 is connected to a non-inverting output Q of the flip-flop and the gate of T3 is connected to an inverting output of the monoflop. The control signal is applied to an inverting input connection "Set" of the flip-flop, whereas this control signal is applied to a non-inverting input Trig of the monoflop. The output signal of the comparator Komp is applied to an inverting reset connection Reset of the flip-flop.

The circuit arrangement in accordance with invention functions as follows: The enable signal Enable is initially at low level. Via the inverting Set input of the flip-flop its output Q is set to a high level. This means that the transistor T4 is already switched on at the beginning of the current pulse. The voltage divider R4, R5 is thus activated and the output signal of the differential amplifier Diff_Amp is correspondingly diminished, in which case the voltage divider is dimensioned in such a way here that the diminution just compensates for the increased gain of the differential amplifier.

To activate the circuit the enable signal Enable now switches to the high level. This results in the rise in the coil current I shown in FIG. 5 on the left until the target current is reached (20 A). In this case the voltage at the input of the comparator Komp now exceeds for the first time the value Vref+Vhyst, so that the comparator output switches to the low level, after which the flip-flop is reset by its reset input Reset. Transistor T4 now switches off and the voltage divider R4, R5 becomes inactive.

The increased gain of the differential amplifier is now effective in the sense of a reduction of the coil current setpoint. This means that a slight voltage drop at the measuring resistor Rsense is sufficient to achieve the value of Vref+Vhyst at the comparator input. The comparator will thus now already switch at a low coil current. If R4 and R5 are the same size the ratio of the original coil current setpoint to the reduced coil current setpoint is around 2 to 1, which corresponds to an abrupt reduction of the setpoint from 20 A to 10 A after the original setpoint of 20 A is reached for the first time. This can be seen in the central area of FIG. 5, in which the current oscillates at a value of around 10 A, so that the current in this area is thus regulated to around 10 A.

The low-high switchover of the enable signal Enable has however also triggered the monoflop. During its time constant (metastable phase) its inverting output Q is at low-level and the transistor T3 is thus switched off. After the time constant has elapsed the inverting output Q of the monoflop switches back to the high-level and thus switches transistor T3 on. This puts the further voltage divider R2, R3 into effect in the sense of an even further reduction of the coil current setpoint, in that the switching voltage which is definitive for the comparator is lowered to a smaller value (than Vref). The result of this is that the comparator Komp now switches at an even smaller coil voltage and the coil voltage is accordingly regulated to an even lower setpoint of around 5 A, as can be seen in FIG. 5 on the right. This ratio of the reduced setpoint to the even further reduced setpoint of around 2 to 1 is achieved here with the same values of R2 and R3. The time constant of the monoflop here is designed so that it corresponds to the movement phase (flight phase) of the magnetic armature of magnetic coil 13. Alternatively the transistor T3 can also be controlled by a microcontroller via a further control signal, as shown by the dashed part of FIG. 4. The monoflop is omitted in this alternative embodiment.

With reference to FIG. 5 the following function phases can be assigned for switching over the magnetic valve:

A "magnetization" phase is used to magnetize the flux amplification parts of the magnetic valve by a coil current which is to be referred to as a saturation current. In this case the soft-magnetized material is preferably completely saturated. In the example shown this first current value is 20 A.

A "move" phase corresponds to the flight phase of the magnetic armature (valve switching process). During this phase the coil current is far below the saturation current and in the example shown, amounts to 10 A. This phase is used for the actual actuation of the valve. This second current value is preferably maintained during the entire flight phase of the magnetic armature from one end position to another end position. At the end of this phase the magnetic armature hits a stop surface of the magnetic valve at considerable speed so that the danger of bounce arises.

The "hold" phase is a hold phase after the magnetic armature has reached its end position to reduce the kinetic energy of the magnetic armature. The third current value of 5 A used in this example serves to hold the magnetic armature on the stop surface until the kinetic energy is reduced. This current value is thus selected so that it is large enough to avoid bouncing of the valve.

During a "recuperation" phase the coil inductivity of the magnetic coil is discharged into the power supply, i.e. the coil current is reduced. This phase can begin when the kinetic energy of the magnetic armature is completely dissipated ("hold" phase).

After the complete switch off of the coil current the magnetic armature will be retained in its end position by a magnetic remanence force. This remanence is created during the "magnetization" phase and thus remains in the material after reduction of the coil current from 20 A to 10 A. For a pressure-compensated construction of the magnetic valve the hydraulic system pressure does not thus exert any force on the magnetic armature, so that the magnetic armature remains in its end position until the second magnetic coil of the a valve is activated by a renewed current pulse. This renewed activation of the magnetic valve can take place as soon as the recuperation phase is ended. The magnetic valve is then ready for a new switchover procedure.

We claim:

1. A circuit arrangement to control a bistable magnetic valve in which a magnetic coil is to be supplied with an electrical current pulse to switch the magnetic valve from a first stable valve state, in which a magnetic armature of the magnetic valve is in a first end position, into a second stable valve state, in which the magnetic armature of the magnetic valve is in a second end position, comprising a power supply source to provide a supply voltage, a power supply device fed by the power supply source and able to be activated during the current pulse by an entered control signal to create a coil current flowing through the magnetic coil, wherein the coil current being set to a setpoint, and changeover circuitry operable to reduce the setpoint of the coil current during the current pulse before the magnetic armature reaches the second end position and operable to reduce the setpoint of the coil current to a lower setpoint when the second end position has been reached;

wherein said changeover circuitry includes a differential amplifier producing a output signal indicative of the coil current, wherein said differential amplifier output signal is provided to a first terminal of a comparator and wherein said first terminal of said comparator is switchably connected to a voltage divider circuit.

2. The circuit arrangement in accordance with claim 1, comprising
   a current regulation unit for regulating the coil current to the setpoint, comprising:
   a) a current switching device, which in a first switching state feeds the supply voltage to the magnetic coil and in a second switching state provides a freerunning circuit for the coil current,
   b) a setpoint reference device to specify the setpoint of the coil current,
   c) a measuring device to measure an actual value of the coil current, and
   d) a regulator for forming a system deviation signal from setpoint and actual value of the coil current and for corresponding activation of the current switching device,
wherein the current regulation device features the changeover circuitry to reduce the setpoint of the coil current when this setpoint is reached for the first time after the beginning of the current pulse.

3. The circuit arrangement in accordance with claim 1, wherein the circuit arrangement is embodied in such a way as to prespecify the setpoint of the coil current so that when this setpoint is reached an essentially complete magnetization of soft-magnetic material is achieved which is arranged to amplify the magnetic flux induced by the magnetic coil in the magnetic valve.

4. The circuit arrangement in accordance with claim 1, wherein the changeover circuitry is embodied to further reduce the reduced setpoint after a prespecified period of time has elapsed wherein the prespecified period of time corresponds to an interval approximately equal to an interval required for the magnetic armature to reach the second end position.

5. The circuit arrangement in accordance with claim 4, wherein the circuit is embodied to prespecify the period of time, depending on at least one variable signal.

6. The circuit arrangement in accordance with claim 1, wherein the first voltage divider circuit is connected to said first terminal of said comparator during an initial portion of the current pulse until the current coil reaches a threshold and is disconnected thereafter for a duration of the current pulse.

7. The circuit arrangement in accordance with claim 6, wherein the power supply voltage is disconnected from the magnetic coil when the current coil reaches the threshold.

8. The circuit arrangement in accordance with claim 6, wherein a second terminal of the comparator is connected to a reference signal and switch connectable to a second voltage divider circuit.

9. The circuit arrangement in accordance with claim 6, wherein the second voltage divider circuit is disconnected during a second initial portion of the current pulse and connected thereafter for a duration of the current pulse.

10. The circuit arrangement in accordance with claim 9, wherein the second initial portion is determined by a duration of a metastable phase of a monostable circuit having an input signal connected to the control signal.

11. A method to control a bistable magnetic valve in which a magnetic coil is to be supplied with an electrical current pulse to switch the magnetic valve from a first stable valve state, in which a magnetic armature of the magnetic valve is in a first end position, into a second stable valve state, in which the magnetic armature of the magnetic valve is in a second end position, comprising the steps:

provviding of a supply voltage, providing power supply from the supply voltage for the duration of the current pulse to create a coil current flowing through the magnetic coil with the coil current being set to a setpoint, and reducing of the setpoint of the coil current during the current pulse before the magnetic armature reaches the second end position including connecting a first voltage divider circuit to a first terminal of a comparator; and reducing the setpoint of the coil current to a lower setpoint when the second end position has been reached including connecting a second voltage divider circuit to second terminal of a comparator.

12. The method in accordance with claim 11, comprising regulating the coil current to the setpoint, wherein the current regulation comprises the steps:

a) feeding the supply voltage to the magnetic coil in a first switching state and forming a free-running circuit for the coil current in a second switching state, b) prespecifying the setpoint of the coil current, c) measuring an actual value of the coil current, and d) forming the system deviation signal from setpoint and actual value of the coil current and corresponding switchover between the first switching state and the second switching state, reducing the setpoint of the coil current when this setpoint is first reached after the beginning of the current pulse.

13. The method in accordance with claim 11, wherein the setpoint of the coil current is specified so that, when this setpoint is reached, an essentially complete magnetization of soft-magnetic material is achieved, which is arranged to strengthen the magnetic flux induced by the magnetic coil in the magnetic valve.

14. The method in accordance with claim 11, wherein the reduced setpoint is reduced even further after a prespecified period of time has elapsed, especially reduced abruptly even further.

15. The method in accordance with claim 14, wherein the period of time is prespecified depending on at least one variable signal.

* * * * *